(No Model.)

I. N. FOSTER.
TRANSPLANTING POT.

No. 378,047. Patented Feb. 14, 1888.

WITNESSES:
J. W. Hubbard.
C. F. Appleton.

INVENTOR:
Isaac N. Foster.
PER C. A. Shaw & Co.
ATTYS.

UNITED STATES PATENT OFFICE.

ISAAC N. FOSTER, OF PEMBROKE, MASSACHUSETTS.

TRANSPLANTING-POT.

SPECIFICATION forming part of Letters Patent No. 378,047, dated February 14, 1888.

Application filed September 19, 1887. Serial No. 250,046. (No model.)

*To all whom it may concern:*

Be it known that I, ISAAC N. FOSTER, of Pembroke, in the county of Plymouth, State of Massachusetts, have invented a certain new and useful Improvement in Transplanting-Pots, of which the following is a description sufficiently full, clear, and exact to enable any person skilled in the art or science to which said invention appertains to make and use the same, reference being had to the accompanying drawings, forming part of this specification, in which—

Figure 1:
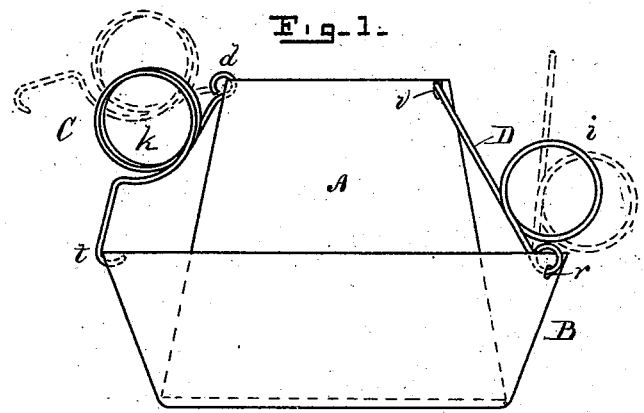
Figure 2:
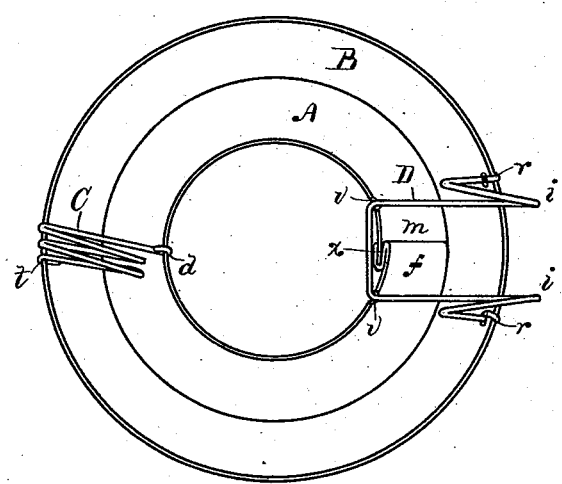
Figure 3:
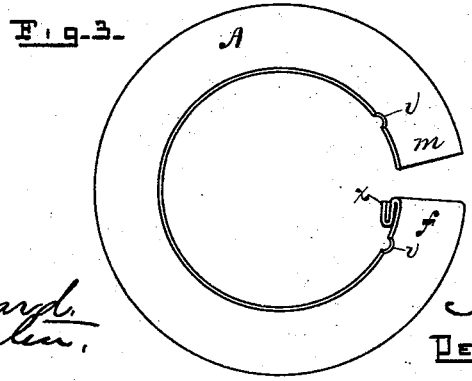

Figure 1 is a side elevation of my improved transplanting-pot; Fig. 2, a top plan view of the same, and Fig. 3 a top plan view of the body detached and expanded.

Like letters of reference indicate corresponding parts in the different figures of the drawings.

My invention relates to that class of transplanting-pots which are provided with detachable bodies; and it consists in a novel construction and arrangement of parts, as hereinafter more fully set forth and claimed, the object being to produce a more effective, simpler, and cheaper article of this character than is now in ordinary use.

The nature and operation of the improvement will be readily understood by all conversant with such matters from the following explanation.

In the drawings, A represents the body, and B the pan. The pan B, which is preferably composed of sheet metal, is circular in form and provided with flaring sides, as best seen in Fig. 1. The body A is composed of a flat strip of elastic material, preferably sheet metal, which is cut in the arc of a circle and bent into the form of a hollow truncated cone. One end, *f*, of the strip of which the body is composed is folded down upon itself to form a socket, *x*, into which the opposite end, *m*, is inserted when the body is in position for use in the pan B. A coiled spring has one of its ends, *t*, bent to form a hook, which is inserted in a hole in the rim of the pan B, its opposite end being bent, as shown at *d*, and inserted in the rim or upper edge of the body A. Said spring constitutes a hinge, C, which serves to connect the body and pan and acts contractively to force the body down into the pan and keep it in place. It also subserves the purpose of a handle for the pot, the forefinger of the hand being inserted in the coil *k* when it is used for that purpose.

A clamp, D, has its ends hinged at *r r* to the rim of the pan B opposite the hinge C, said clamp being adapted to overlap the upper edge of the body A and rest in recesses *v*, formed therein near its ends *m f*, when in use. The clamp D is composed of elastic wire and provided with a large coil, *i*, in each of its arms, which act to draw the upper portion of the clamp down onto the body A and secure said body in position in the pan B. The coils *i* also subserve the purpose of a handle for the pot. The clamp D also serves as a fastener for keeping the body closed or from accidental expanding when filled with earth. Any equivalent fastening device may be used for this purpose.

In the use of my improvement the body A is placed centrally in the pan B, the end *m* being inserted in the socket *x*. The clamp D is then drawn upward until it overlaps the upper edge of said body at its seam and inserted in the recesses *v*, as shown in Figs. 1 and 2, thereby preventing the end *m* from being withdrawn from the socket *x*, and also, in conjunction with the hinge C, securing the body in position in the pan. The body is then filled with loam or earth, in which the seeds are planted or the young plants set out, as the case may be, and when the plants have attained the proper size and the season arrives for transplanting, the clamp D is unhooked from the body A and the hinge C from the pan B, and said body carefully removed from the pan, care being taken not to disturb the contents and to keep the end *m* in the socket *x*. The body is then placed in or over the hole in which the plant is to be set and the end *m* withdrawn or partially withdrawn from the socket *x*, thereby expanding the body and permitting the plant and earth or loam surrounding it to remain in or drop into the hole in a manner which will be readily understood without a more explicit description. The body being conical, a slight rap on its exterior will usually cause the loam or earth contained therein to drop readily through the bottom or larger end of said body when the pan is removed without withdrawing the end $m$ from the socket $x$; but in case it does not, said end can be withdrawn, and thereby expand the body to such an extent as to detach it from its contents. The body being composed of elastic sheet metal, when the clamp D is removed from the recesses $v$ it will generally open or expand automatically unless prevented by grasping it in the hand.

It will be understood that the pan serves as a bottom to the body, and is also designed to receive the water used in watering the plants.

Having thus explained my invention, what I claim is—

1. In a transplanting-pot of the character described, the combination of a pan, an expansible body, said body being in the shape of a hollow truncated cone, an elastic hinge connecting the body and pan, and an elastic clamp for securing the body in the pan, substantially as described.

2. In a transplanting-pot, the pan B, body A, hinge C, and clamp D, constructed, combined, and arranged to operate substantially as set forth.

3. The combination of the body A, provided with a hole near its upper end, and the pan B, also provided with a hole near its upper edge, and the hinge C, composed of elastic wire and provided with hooks at its opposite ends for engaging said hole and with an intermediate coil, $k$, adapted to serve as a handle, substantially as described.

4. The combination of an expansible body, A, composed of a sheet-metal strip provided at one end with a socket for receiving the other end, and also provided with notches on its upper edge near its meeting ends, a detachable bottom for said body, a hinge connecting said bottom and body, and a clamp, also connecting said bottom and body and engaging said notches for holding the body in closed position.

5. The body A, composed of sheet metal or analogous material, and having the socket $x$ and recesses $v$, in combination with the elastic clamp D, elastic hinge C, and pan B, substantially as set forth.

6. In a device for transplanting plants, an expansible body composed of sheet metal, said body being in the shape of a hollow truncated cone, in combination with a pan for said body, a fastener for securing the body to the pan, and a fastener for keeping said body closed when filled with earth, substantially as described.

ISAAC N. FOSTER.

Witnesses:
C. A. SHAW,
O. M. SHAW.